(12) United States Patent
Soenmez et al.

(10) Patent No.: US 8,931,290 B2
(45) Date of Patent: Jan. 13, 2015

(54) AUXILIARY COOLING DEVICE FOR CONNECTION TO AN AIRCRAFT LIQUID COOLING SYSTEM

(75) Inventors: Kenan Soenmez, Hamburg (DE); Luc Leroy, Toulousse (FR)

(73) Assignees: Airbus Operations GmbH, Hamburg (DE); Airbus S.A.S., Blagnac Cedex (FR)

( * ) Notice: Subject to any disclaimer, the term of this patent is extended or adjusted under 35 U.S.C. 154(b) by 1052 days.

(21) Appl. No.: 13/000,524

(22) PCT Filed: Jun. 24, 2009

(86) PCT No.: PCT/EP2009/004559
§ 371 (c)(1),
(2), (4) Date: Jun. 25, 2011

(87) PCT Pub. No.: WO2009/156140
PCT Pub. Date: Dec. 30, 2009

(65) Prior Publication Data
US 2011/0284201 A1 Nov. 24, 2011

Related U.S. Application Data

(60) Provisional application No. 61/075,819, filed on Jun. 26, 2008.

(30) Foreign Application Priority Data

Jun. 26, 2008 (DE) .......................... 10 2008 030 401

(51) Int. Cl.
*B60H 1/32* (2006.01)
*B64F 1/36* (2006.01)
*F25B 7/00* (2006.01)

(52) U.S. Cl.
CPC . *B64F 1/364* (2013.01); *Y02T 50/82* (2013.01)
USPC .................................. 62/175; 62/79; 62/244

(58) Field of Classification Search
USPC ............................................. 62/201, 79, 175
See application file for complete search history.

(56) References Cited

U.S. PATENT DOCUMENTS 2,036,979 A * 4/1936 Askin et al. ...................... 62/163
2,791,401 A * 5/1957 Harslem et al. .................. 165/42
(Continued)

FOREIGN PATENT DOCUMENTS

CN 2572261 9/2003
CN 2646051 10/2004
(Continued)

OTHER PUBLICATIONS

Chinese Intellectual Property Office; Office Action (5 pgs.); Feb. 20, 2013.
(Continued)

*Primary Examiner* — Ljiljana Ciric
*Assistant Examiner* — Alexis Cox
(74) *Attorney, Agent, or Firm* — Wood, Herron & Evans, LLP

(57) ABSTRACT

An auxiliary cooling device is configured to be operated outside of an aircraft. The auxiliary cooling device is configured to be connected to an aircraft liquid cooling system which includes a refrigerating device, a coolant supply connection, a coolant discharge connection, and a control device. The auxiliary cooling device includes a cold source that is adapted to cool a coolant down to a desired low temperature, an auxiliary cooling device outlet which is connected to the cold source and connectable to the coolant supply connection. The auxiliary cooling device also includes an auxiliary cooling device inlet which is connected to the cold source and connectable to the coolant discharge connection of the aircraft liquid cooling system.

12 Claims, 3 Drawing Sheets

(56) References Cited

U.S. PATENT DOCUMENTS

| | | | |
|---|---|---|---|
| 2,947,154 A * | 8/1960 | Chausson | 62/169 |
| 4,152,901 A * | 5/1979 | Munters | 62/112 |
| 4,321,797 A * | 3/1982 | Yaeger et al. | 62/79 |
| 5,351,502 A * | 10/1994 | Gilles et al. | 62/238.7 |
| 6,205,803 B1 | 3/2001 | Scaringe | |
| 7,322,203 B2 * | 1/2008 | Widegren | 62/97 |
| 7,651,052 B2 * | 1/2010 | Delort | 244/58 |
| 7,854,131 B2 * | 12/2010 | Ullman et al. | 62/78 |
| 8,209,993 B2 * | 7/2012 | Carlson et al. | 62/259.2 |
| 8,393,165 B2 * | 3/2013 | Soenmez et al. | 62/77 |
| 8,528,348 B2 * | 9/2013 | Ebigt et al. | 62/79 |
| 8,713,950 B2 * | 5/2014 | Roering | 62/175 |
| 8,720,217 B2 * | 5/2014 | Reed et al. | 62/244 |
| 2006/0201173 A1 | 9/2006 | Leathers | |
| 2007/0209383 A1 | 9/2007 | Hutton | |
| 2008/0250803 A1 * | 10/2008 | Leadingham et al. | 62/236 |
| 2009/0107159 A1 | 4/2009 | Mann, III et al. | |
| 2009/0107160 A1 * | 4/2009 | Montminy et al. | 62/239 |
| 2009/0108552 A1 * | 4/2009 | Mann et al. | 280/79.3 |

FOREIGN PATENT DOCUMENTS

| | | |
|---|---|---|
| CN | 2646052 | 10/2004 |
| DE | 29702259 | 7/1997 |
| WO | 2009058628 | 5/2009 |

OTHER PUBLICATIONS

Electro Impulse, Inc., 2000 Catalog, RF Dummy Loads, Calorimeters and Cooling Equipment for Electronics.
Internet article XP-002565421, Military F-22 Raptor Flight Critical Systems, www.globalsecurity.org/millitary/systems/aircraft/f-22-fcas.htm, Jan. 21, 2008.
ITWMILITARYGSE: "Water Chilled / Electric Powered Test Stand Skid Unit," Palmetto, Florida, Feb. 18, 2008.
TLD Military Products, XP002565422, www.tld-gse.com, Jan. 18, 2010.
European Patent Office, International Search Report, Form PCT/ISA/210, Feb. 19, 2010, and PCT Written Decision, PCT forms PCT/ISA/220 and PCT/ISA.237.

* cited by examiner

AUXILIARY COOLING DEVICE FOR CONNECTION TO AN AIRCRAFT LIQUID COOLING SYSTEM

This application claims priority to PCT Application No. PCT/EP2009/004559, filed on Jun. 24, 2009, under Section 371 and/or as a continuation under Section 120, which claims priority to German Application No. 10 2008 030 401.8 and U.S. Provisional Application No. 61/075,819, both filed on Jun. 26, 2008.

TECHNICAL FIELD

The invention relates to an external auxiliary cooling device for cooling components and/or cabin areas of an aircraft on the ground and to an aircraft liquid cooling system that interacts with the external auxiliary cooling device.

BACKGROUND

In aircraft, increasing use is being made of central liquid cooling systems. A typical liquid cooling system comprises a refrigerating machine that delivers cold liquid coolant. The liquid coolant is conveyed by means of a line network to one or more heat loads in the aircraft. A plurality of heat loads connected in series and/or in parallel may be supplied with liquid coolant. The liquid coolant, after cooling the heat load(s), is returned to the refrigerating machine so that it circulates permanently in a closed circuit. Liquid cooling systems have the advantage that the lines for transporting the liquid coolant may be of a much thinner design than in a cooling system that uses a is gaseous fluid, for example air, as a coolant because a liquid coolant is able to absorb much more heat than a gaseous coolant. The thinner lines have the advantage that they are easier to install in an aircraft and more space is available for other components of the aircraft. With a liquid coolant, moreover, greater distances between the refrigerating machine and the heat load may be bridged. The liquid coolant may be for example water, a mixture of water and glycol, or a refrigerant medium liquid based on fluorocarbons. The liquid coolant may have a temperature between ca. −9° C. and ca. 10° C. or ca. 1° C. and ca. 10° C. It is also conceivable for the coolant to have a lower or higher temperature.

The liquid cooling system may cool a food trolley as well as food and drinks in the galley. For this purpose, liquid-gas heat exchangers are provided. The liquid coolant passes into the liquid-gas heat exchanger and cools air that is directed by means of a fan into the food trolley and onto the food and drinks in the galley. It is also possible to cool the flight control computers (avionics bay) or the entertainment systems (IFE: in-flight entertainment) with liquid coolant. The liquid cooling system may also be used to individually cool cabin areas, for example first-class suites or the area around a business-class seat. The refrigerating machine may be a compression-type refrigerating machine that is disposed inside the pressurized cabin. This has the drawback that the waste heat of the compression-type refrigerating machine additionally loads the air conditioning system of the cabin because the air conditioning system has to cool an additional heat load in the pressurized cabin. It is also possible for the refrigerating machine to take the form of a compression-type refrigerating machine that is disposed outside of the pressurized fuselage. In this case, the waste heat of the refrigerating machine is released into the environment.

It is self-evident that such a liquid cooling system has to be designed for the least favourable load scenario. One of the least favourable load scenarios is a high ambient temperature when the aircraft is on the ground. In this situation, a compression-type refrigerating machine arranged outside of the pressurized fuselage has to provide considerably more cooling capacity than during a flight at high altitude, when a lower outside temperature prevails. In order to provide the cooling capacity needed on the ground, a compressor, an evaporator and a condenser of the compression-type refrigerating machine have to be of a powerful design. This is however linked to an increased weight. This means that the aircraft while in flight has to carry extra weight in the form of the powerful compressor, evaporator and condenser in order to provide the required cooling capacity while on the ground. This powerful design of the components is not needed in flight. The extra weight entailed by the powerful design leads to higher fuel consumption and reduces the available payload. This compression-type refrigerating machine is moreover more difficult to install in an aircraft as the powerful compressor, evaporator and condenser take up extra installation space.

SUMMARY OF THE INVENTION

The underlying object of the invention is to reduce the weight of a liquid cooling system for an aircraft.

To achieve this object, the invention provides an auxiliary cooling device that is configured to be operated outside of an aircraft. The auxiliary cooling device comprises a cold source that is adapted to cool a coolant down to a desired low temperature. The coolant cooled by the cold source of the auxiliary cooling device may be a liquid coolant. The auxiliary cooling device further comprises an auxiliary cooling device outlet, which is connected to the cold source and connectable to a coolant supply connection of an aircraft liquid cooling system in order to deliver to the aircraft liquid cooling system coolant cooled to a desired low temperature by the cold source, and an auxiliary cooling device inlet, which is connected to the cold source and connectable to a coolant discharge connection of the aircraft liquid cooling system in order to receive coolant heated by heat absorption from a heat load in the aircraft.

The auxiliary cooling device provides the cooling capacity that is needed to operate devices of an aircraft to be cooled on the ground. The capacity and the connections of the auxiliary cooling device may be adapted, depending on the system specification and system architecture. A device to be cooled may be for example a food trolley, a food container, a drinks container, a flight control computer, an entertainment system and/or a cabin area of the aircraft to be individually air-conditioned. The auxiliary cooling device according to the invention allows a liquid cooling system of the aircraft to be of a less powerful design, this being linked to a weight reduction.

The auxiliary cooling device may comprise an auxiliary cooling device interface, which is directed to receive from a control device of the aircraft liquid cooling system a signal that indicates a coolant requirement and/or a setpoint temperature of the coolant to be delivered to the aircraft liquid cooling system. The auxiliary cooling device may further be adapted to deliver coolant cooled down to a desired low temperature by means of the cold source at the auxiliary cooling device outlet to the aircraft liquid cooling system in accordance with the signal received by the auxiliary cooling device interface. Operation of the auxiliary cooling device may be completely controlled by the control device of the aircraft liquid cooling system. It is however alternatively possible to supply the signals provided by the control device of the aircraft liquid cooling system to a control device of the auxiliary cooling device that then controls the individual components of the auxiliary cooling device, such as for example the cold source, a pump, corresponding valves or the like, in dependence upon the signals of the control device of the aircraft liquid cooling system.

The auxiliary cooling device may have wheels to allow it to be moved, when in use, to the aircraft to be supplied with cooling energy. It is however also possible to install the auxiliary cooling device in a stationary manner in an airport area and to provide suitably long lines to convey the coolant to, and away from, the aircraft.

The auxiliary cooling device may comprise a filter device for filtering the liquid coolant. This ensures that the liquid coolant in the cooling circuit of the aircraft liquid cooling system is always of a suitably high quality. The liquid coolant received by means of the auxiliary cooling device may, after cooling, be discharged by the auxiliary cooling device at the auxiliary cooling device outlet. This ensures that the liquid coolant provided by the auxiliary cooling device flows permanently in a closed circuit. If the liquid cooling system of the aircraft has a reservoir, the auxiliary cooling device may be configured to fill this reservoir of the liquid cooling system of the aircraft. For this purpose there has to be a suitably large reservoir in the auxiliary cooling device.

The auxiliary cooling device may comprise a diesel motor, preferably with an integrated generator. Alternatively, the auxiliary cooling device may be operable electrically. The auxiliary cooling device may further be adapted to fill the aircraft liquid cooling system with coolant and/or to drain coolant from the aircraft liquid cooling system.

The invention relates also to an aircraft liquid cooling system comprising a refrigerating device that is configured to cool a liquid coolant, which circulates in a cooling circuit of an aircraft, down to a desired low temperature. A coolant supply connection of the aircraft liquid cooling system is connectable to an auxiliary cooling device outlet of an auxiliary cooling device according to the invention in order to receive coolant cooled down to a desired low temperature by a cold source of the auxiliary cooling device. A coolant discharge connection of the aircraft liquid cooling system, on the other hand, is connectable to an auxiliary cooling device inlet of the auxiliary cooling device in order to deliver coolant heated by heat absorption from a heat load in the aircraft to the auxiliary cooling device.

The refrigerating device of the aircraft liquid cooling system according to the invention may be designed merely for the capacity needed in flight. On the ground, on the other hand, the aircraft liquid cooling system may be provided by the auxiliary cooling device according to the invention with coolant cooled down to a desired low temperature. As the refrigerating device of the aircraft liquid cooling system according to the invention may be designed with less powerful components, for example a less powerful compressor, condenser and evaporator, the entire aircraft liquid cooling system has a lower weight, this reducing the fuel consumption of the aircraft and increasing the payload of the aircraft. Additionally, as the less powerfully designed components of the refrigerating device take up less space, the integration of the aircraft liquid cooling system in the aircraft is simplified and there is extra installation space available for other components of the aircraft.

As mentioned previously, the at least one heat load may be a food trolley in the galley, a food- or drinks area in the galley, a flight control computer, an entertainment system and/or a cabin area to be individually air-conditioned. The aircraft liquid cooling system may also assist an air conditioning system of the aircraft. The previously mentioned heat load is supplied with cold coolant in flight solely by the refrigerating device of the aircraft liquid cooling system. When the aircraft is situated on the ground, the heat load may be supplied with cold coolant by the auxiliary cooling device and, where desired, also by the refrigerating device of the aircraft liquid cooling system.

The aircraft liquid cooling system may further comprise a control device, which is directed to transmit via an aircraft cooling system interface to the auxiliary cooling device interface of the auxiliary cooling device a signal that indicates a coolant requirement and/or a setpoint temperature of the coolant to be delivered to the aircraft liquid cooling system. The control device of the aircraft liquid cooling system may be adapted to control the entire operation of the auxiliary cooling device. Alternatively, the control device of the aircraft liquid cooling system may however supply its signals via the auxiliary cooling device interface of the auxiliary cooling device also to a separate control device of the auxiliary cooling device that then in turn controls the operation of the individual components of the auxiliary cooling device. The aircraft cooling system interface and the auxiliary cooling device interface may be any wire-bound or wireless interfaces.

The aircraft liquid cooling system preferably comprises a coolant supply line connected to the coolant supply connection as well as a coolant discharge line connected to the coolant discharge connection. In the coolant supply line a coolant supply convection valve may be arranged. In a similar fashion, a coolant discharge connection valve may be arranged in the coolant discharge line. This arrangement ensures that the aircraft liquid cooling system does not lose any coolant when no auxiliary cooling device is connected and the coolant supply connection valve and the coolant discharge connection valve are closed. It is self-evident that the coolant supply connection valve and the coolant discharge connection valve have to be open while coolant is being supplied by the auxiliary cooling device to the aircraft liquid cooling system.

The coolant supply line and the coolant discharge line may open out into the cooling circuit of the aircraft liquid cooling system connected to the refrigerating device. In the cooling circuit preferably a first valve is arranged between a debouchment point of the coolant supply line and a debouchment point of the coolant discharge line. If the first valve is open, coolant is circulated in the cooling circuit of the aircraft liquid cooling system. If on the other hand the first valve is closed, coolant flows from the auxiliary cooling device through the coolant supply connection into the cooling circuit of the aircraft liquid cooling system. Coolant from the cooling circuit of the aircraft liquid cooling system, on the other hand, flows to the coolant discharge connection and is discharged into the auxiliary cooling device. A precondition for this is naturally that the coolant supply connection valve and the coolant discharge connection valve are open.

The first valve may be formed as a ball valve, as a return valve or as an electrical control-valve or may be integrated in a pump arranged in the cooling circuit.

The aircraft liquid cooling system may further comprise a second valve arranged upstream of the refrigerating device in the cooling circuit of the aircraft liquid cooling system, as well as a bypass line bypassing the refrigerating device. Depending on the position of the second valve, coolant flowing through the cooling circuit of the aircraft liquid cooling system may be conveyed either through the refrigerating device or past the refrigerating device.

The aircraft liquid cooling system may be provided with a heat exchanger. The heat exchanger preferably comprises a first fluid line as well as a second fluid line thermally coupled to the first fluid line, wherein the first fluid line is connected in a fluid-conveying manner to the cooling circuit of the aircraft liquid cooling system and the second fluid line is connected to the coolant supply connection as well as to the coolant discharge connection of the aircraft liquid cooling system. This embodiment has the advantage that the liquid coolant of the aircraft and the coolant of the auxiliary cooling device are not mixed with one another. It is therefore possible to guarantee a consistently high quality of the liquid coolant of the aircraft. It is further possible to use a different coolant for the cooling circuit of the aircraft than for the auxiliary cooling device. Thus, for each type of aircraft it is possible to use a specially adapted liquid coolant in the aircraft liquid cooling system and even a gaseous or a two-phase coolant for the auxiliary cooling device.

The control device of the aircraft liquid cooling system may be adapted to control the refrigerating device, the first valve, the coolant supply connection valve and/or the coolant discharge connection valve. When the aircraft is situated on the ground and the auxiliary cooling device is connected to the aircraft, the control device may open the coolant supply connection valve and the coolant discharge connection valve. In addition, the first valve may be closed. Thus, liquid coolant that is discharged through the coolant discharge connection is supplied through the coolant supply connection to the aircraft liquid cooling system. The control device may further switch the second valve in such a way that the coolant is conveyed through the bypass line past the refrigerating device. In this case, the refrigerating device may be completely switched off. The coolant supplied through the coolant supply connection may also be conveyed through the refrigerating device if the second valve is switched accordingly or there is no second valve. In this case, the control device may however nevertheless switch off the refrigerating device, so that only the auxiliary cooling device supplies the cooling circuit of the aircraft with liquid coolant. Alternatively, the control device may however switch on the refrigerating device or leave the refrigerating device switched on so that it delivers extra cooling capacity.

The aircraft liquid cooling system may have a reservoir for receiving liquid coolant. The control device of the aircraft liquid cooling system may further be configured to effect that coolant supplied from the coolant supply connection is conveyed into the reservoir. For this purpose a reservoir valve may be provided, which conveys the coolant supplied from the coolant supply connection into the reservoir. The reservoir inlet valve may be situated at any desired point in the cooling circuit. It is self-evident that the reservoir may also have a reservoir outlet valve, by means of which additional coolant may be supplied to the cooling circuit in the event of a leakage. By means of the reservoir a thermal expansion of the liquid coolant in the event of a change of temperature, for example if the aircraft is out of service, may also be compensated.

The control device of the aircraft liquid cooling system may finally be adapted in a special mode to control the communication between the aircraft liquid cooling system and the auxiliary cooling device.

The invention relates also to a method of cooling at least one heat load on board an aircraft, in which a previously described auxiliary cooling device is connected to a previously described aircraft liquid cooling system and coolant cooled by means of the auxiliary cooling device is supplied to the aircraft liquid cooling system.

The auxiliary cooling device may be connected to the aircraft liquid cooling system and supply cooled coolant to the aircraft liquid cooling system during ground operation of the aircraft, after a flight and/or before a flight. During taxiing, take-off, ascent, cruising, descent and landing, on the other hand, the heat load may be cooled by the aircraft liquid cooling system. The auxiliary cooling device may be used to assist an aircraft air conditioning system and be connected to the aircraft liquid cooling system in order to supply cooled coolant to the aircraft liquid cooling system for supporting the aircraft air conditioning system.

Lines integrated in the auxiliary cooling device and/or in the aircraft liquid cooling system, and/or connection lines between the auxiliary cooling device and the aircraft liquid cooling system are preferably vented in order to guarantee proper operation of the entire system.

BRIEF DESCRIPTION OF THE DRAWINGS

There now follows a detailed description of the invention with reference to the accompanying schematic drawings, of which.

DETAILED DESCRIPTION

Figure 1:
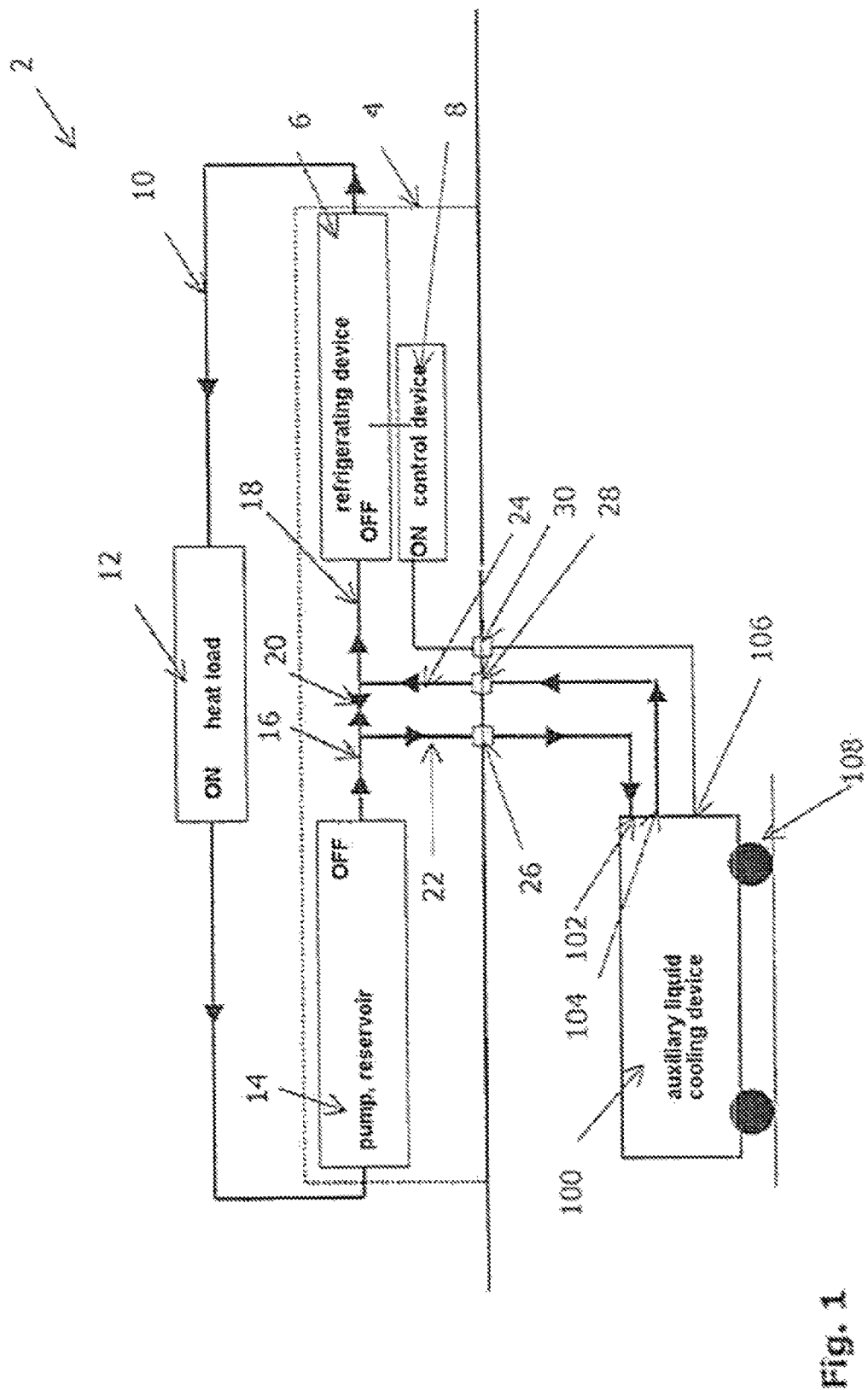
FIG. 1 shows a first embodiment of an aircraft liquid cooling system and of an auxiliary cooling device in a first operating state.

FIG. 1 shows an aircraft liquid cooling system 4 in an aircraft 2 and an auxiliary cooling device 100. The aircraft liquid cooling system 4 comprises a refrigerating device 6, a control device 8, a pump and a reservoir 14, a first line 18, a second line 16 and a first valve 20. In flight, the refrigerating device 6 cools liquid coolant, which is delivered to a line 10. The liquid coolant cools a heat load 12. The pump 14 feeds the coolant through the cooling circuit. The reservoir 14 provides additional coolant in the event of a leakage. As the first valve 20 between the first line 18 and the second line 16 is open in flight, the liquid coolant circulates in the cooling circuit.

The heat load 12 may be a food trolley in the galley, a food- or drinks area in the galley, a flight control computer, an entertainment system and/or an area of a cabin to be individually air-conditioned. The area of a cabin to be individually air-conditioned may be a first-class suite and/or an area around an aircraft seat.

To keep the weight of the aircraft liquid cooling system 4 as low as possible, the refrigerating device 6 is designed such that it provides enough cooling capacity to cool the heat load 12 only while in flight. The refrigerating device 6 may operate in accordance with a conventional circuit process of compression, condensation and evaporation. The refrigerating device 6 may be situated outside of the pressurized area of the aircraft fuselage. The condenser of the refrigerating device 6 is therefore exposed substantially to the outside temperature. As the outside temperature on the ground may acquire relatively high values compared with the temperature while flying at high altitude, the capacity of the refrigerating device 6 is not enough to supply the heat load 12 with sufficient cooling energy on the ground. Furthermore, on the ground the heat load 12 may have an increased cooling requirement, for example if the heat load is an area of an aircraft cabin to be individually air-conditioned.

The aircraft liquid cooling system 4 further comprises a coolant discharge connection 26, a coolant discharge line 22, a coolant supply connection 28 and a coolant supply line 24. A coolant discharge connection valve (not shown) and a coolant supply connection valve (not shown) are integrated in the auxiliary cooling device 100. The aircraft liquid cooling system 4 further comprises an aircraft cooling system interface 30 that is connected to the control device 8. The control device 8 controls the function of the refrigerating device 6, the pump 14, the reservoir 14, the first valve 20, the coolant supply connection valve and the coolant discharge connection valve.

An auxiliary cooling device 100 comprises an auxiliary cooling device inlet 102 for receiving coolant from the aircraft and an auxiliary cooling device outlet 104 for delivering coolant to the aircraft 2. The auxiliary cooling device 100 further comprises an auxiliary cooling device interface 106. The auxiliary cooling device 100 comprises a cold source (not shown). The cold source may operate in accordance with a conventional circuit process of compression, condensation and evaporation. It is however also conceivable for the cold source to be formed by an absorption-type cooling system or an adsorption-type cooling system. The auxiliary cooling device 100 via the auxiliary cooling device interface 106 receives signals from the control device 8 of the aircraft 2 that indicate a liquid coolant requirement and/or a temperature of the liquid coolant to be delivered. The auxiliary cooling device 100, i.e. the cold source of the auxiliary cooling device 100 as well as further components of the auxiliary cooling device 100, such as for example a pump or the like, is/are controlled in dependence upon these signals in such a way that cold liquid coolant is discharged at the auxiliary cooling device outlet 104 in a quantity and/or at a temperature corresponding to the signals received by the auxiliary cooling device interface 106.

The auxiliary cooling device 100 is provided with wheels 108 to allow the auxiliary cooling device 100 to be moved to an aircraft 2 to be supplied with cooling energy. It is however alternatively possible to accommodate the auxiliary cooling device in a stationary manner, for example in an airport building, and to provide suitably long lines to a parking position of an aircraft 2.

The auxiliary cooling device 100 discharges the coolant received at the cooling device inlet, after cooling to a desired low temperature, at the auxiliary cooling device outlet 104. The auxiliary cooling device 100 further comprises a filter device for filtering the liquid coolant. By filtering the liquid coolant, the coolant in the aircraft 2 may be maintained at a relatively high quality.

In order to cool the heat load 12 sufficiently during ground operation of the aircraft 2, the auxiliary cooling device 100 is connected to the aircraft liquid cooling system 4 of the aircraft 2. For this purpose the auxiliary cooling device outlet 104 of the auxiliary cooling device 100 is connected to the coolant supply connection 28 of the aircraft liquid cooling system 4 of the aircraft 2. Moreover, the auxiliary cooling device inlet 102 is connected to the coolant discharge connection 26 of the aircraft liquid cooling system 4 of the aircraft 2. Finally, the auxiliary cooling device interface 106 is connected to the aircraft cooling system interface 30. The coolant supply connection 28 and the coolant discharge connection 26 of the aircraft liquid cooling system 4 are preferably situated on or in the vicinity of the so-called ground service panel of the aircraft 2. To connect a line to the coolant supply connection 28 and to the coolant discharge connection 26, respectively, preferably self-locking quick couplings are used.

In the embodiment shown in FIG. 1, the control device 8 switches off the refrigerating device 6 of the aircraft liquid cooling system 4, closes the first valve 20, opens the coolant discharge connection valve and opens the coolant supply connection valve if external cooling is desired or required. Liquid coolant may therefore flow from the auxiliary cooling device outlet 104 of the auxiliary cooling device 100 to the coolant supply connection 28 of the aircraft liquid cooling system 4 of the aircraft 2. The coolant flows through the switched-off refrigerating device 6 and through the line 10 to the heat load 12. From the heat load 12 the coolant flows through the switched-off pump 14 of the aircraft liquid cooling system 4 to the coolant discharge connection 26. The coolant then flows through the auxiliary cooling device inlet 102 back into the auxiliary cooling device 100.

In the auxiliary cooling device 100 the liquid coolant is cooled by means of the cold source before being discharged through the auxiliary cooling device outlet 104. The control device 8 via the aircraft cooling system interface 30 and the auxiliary cooling device interface 106 may indicate by means of a corresponding signal a liquid coolant requirement and/or a temperature of the liquid coolant to be discharged. The signal may be a binary signal that merely switches on the cold source of the auxiliary cooling device 100 and therefore indicates that there is a liquid coolant requirement. The control device 8 may however also specify a flow rate and/or a temperature of the liquid coolant.

Figure 2:
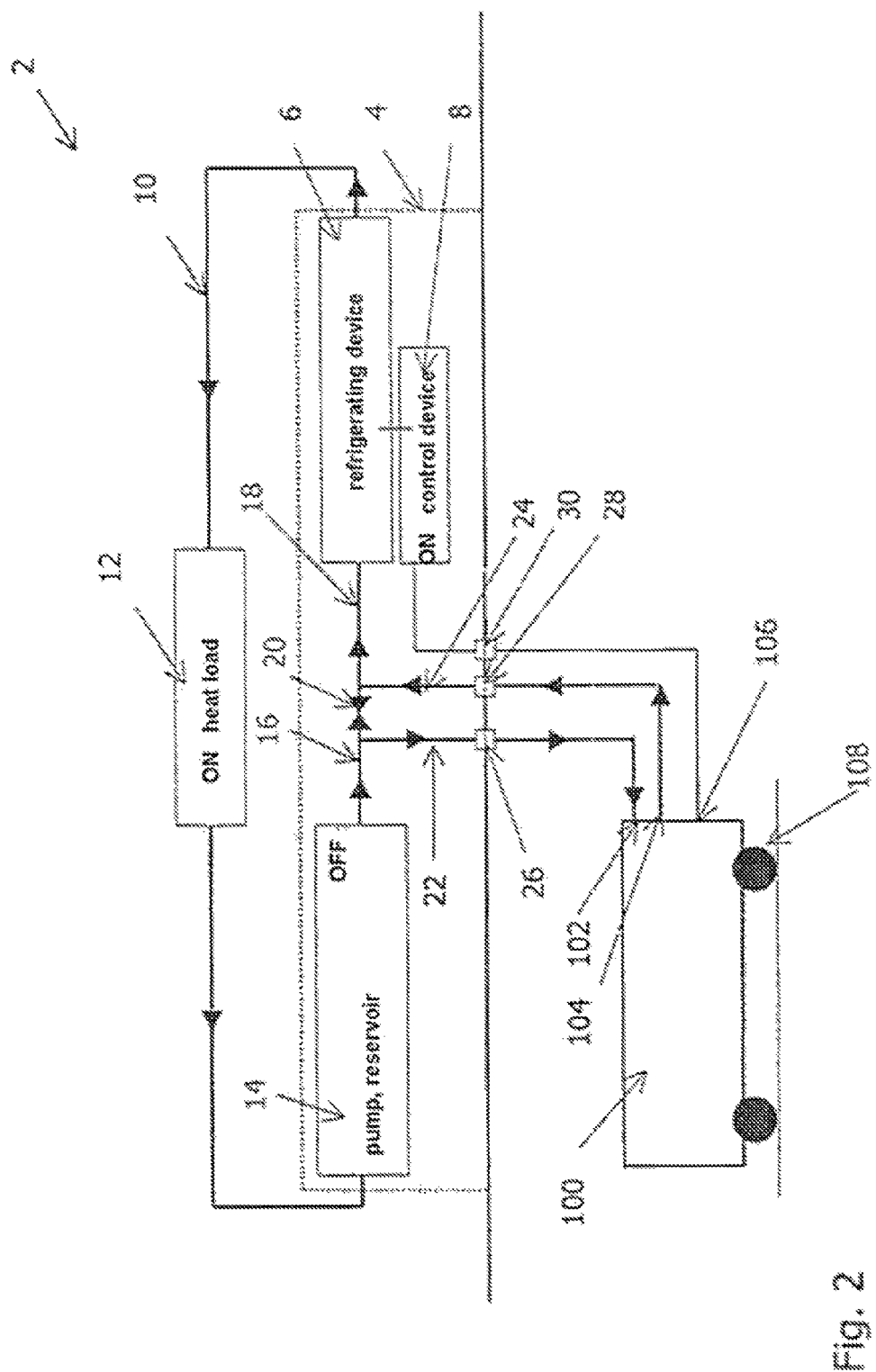
FIG. 2 shows the aircraft liquid cooling system and the auxiliary cooling device according to FIG. 1 in a second operating state.

The arrangement shown in FIG. 2 corresponds to the arrangement according to FIG. 1, except that the control device 8 does not switch off the refrigerating device 6 of the aircraft liquid cooling system 4 but switches it on or leaves it switched on. In this case, both the cold source of the auxiliary cooling device 100 and the refrigerating device 6 of the aircraft liquid cooling system 4 cool the liquid coolant. The cold source of the auxiliary cooling device 100 may consequently be of weaker dimensions. The first valve 20 during operation of the arrangement shown in FIG. 2 is closed.

Figure 3:
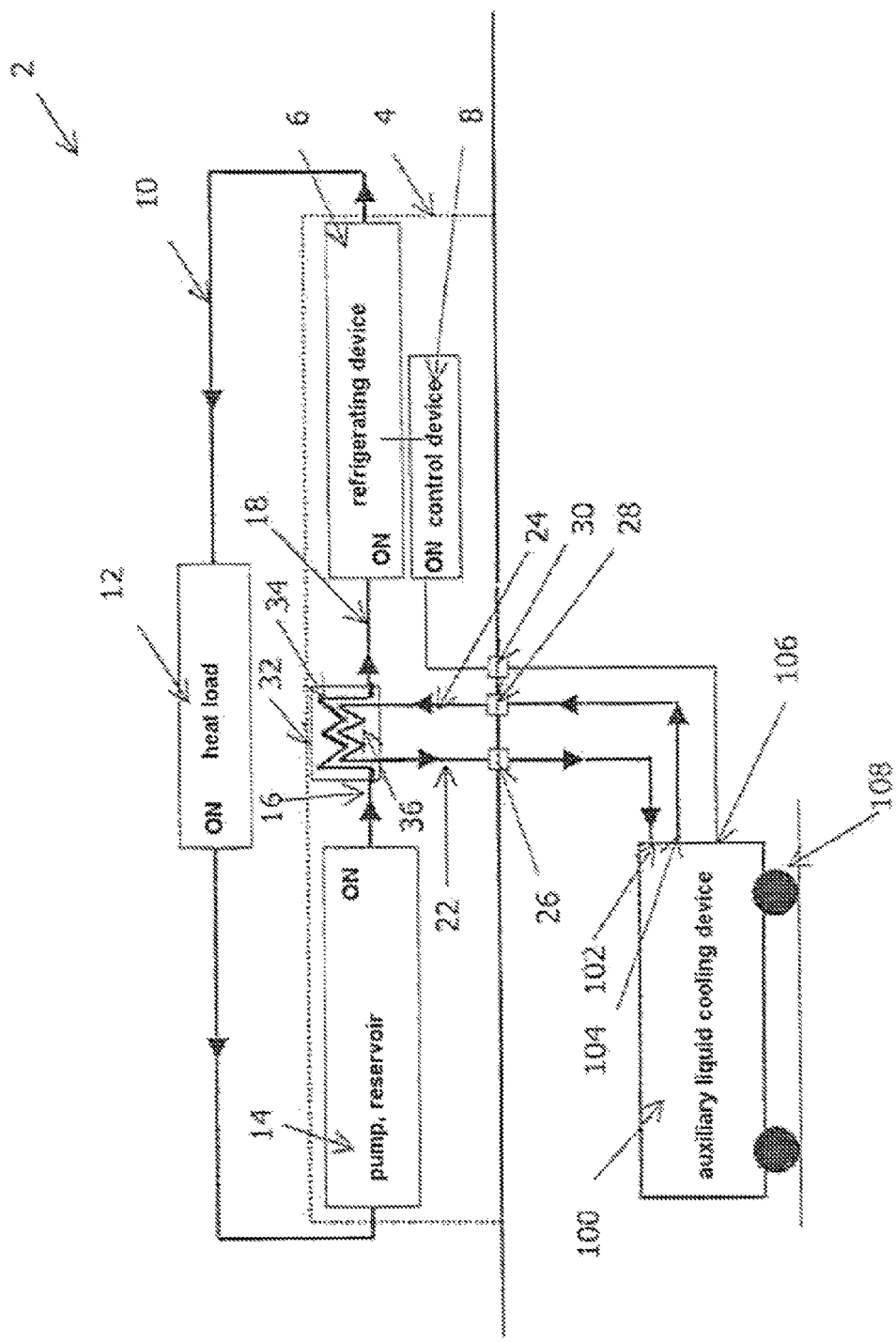
FIG. 3 shows a further embodiment of an aircraft liquid cooling system and of an auxiliary cooling device.

The arrangement according to FIG. 3 comprises a heat exchanger 32 between the second line 16 and the first line 18. The heat exchanger 32 comprises a first fluid line 34 and a second fluid line 36. The heat exchanger 32 is configured in such a way that heat and/or cold may be transferred from the first fluid line 34 to the second fluid line 36 and vice versa. The heat exchanger 32 separates the liquid coolant of the aircraft liquid cooling system 4 from the liquid coolant of the auxiliary cooling device 100. It is self-evident that in this embodiment the pump 14 of the aircraft liquid cooling system 4 has to be switched on. The coolant supply connection 26 and the coolant discharge connection 28 of the aircraft liquid cooling system 4 of the aircraft 2 are connected to the second line 36 of the heat exchanger 32. Thus, in the heat exchanger 32 the coolant supplied by the auxiliary cooling device 100 may absorb heat from the liquid coolant of the aircraft liquid cooling system 4 of the aircraft 2 flowing in the first line 34 of the heat exchanger 32.

Given this arrangement, the control device 8 may either switch on the refrigerating device 6 of the aircraft liquid cooling system 4 or leave it switched on, respectively, or switch it off. If the refrigerating device 6 is switched on, the auxiliary cooling device 100 has to provide less cooling capacity, thereby allowing the cold source of the auxiliary cooling device 100 to be of smaller dimensions. As the liquid coolant of the auxiliary cooling device 100 is not mixed with the liquid coolant of the aircraft liquid cooling system 4, the quality of the liquid coolant of the aircraft liquid cooling system 4 may, as was previously described, be better assured. Furthermore, the coolant for the auxiliary cooling device 100 and the coolant for the aircraft liquid cooling system 4 may be selected independently of one another and almost arbitrarily. It is conceivable that in this embodiment the auxiliary cooling device 100 provides a gaseous coolant or that the liquid coolant from the auxiliary cooling device 100 is at least partially evaporated in the heat exchanger 32.

The auxiliary cooling device 100 may be connected to the aircraft 2 on the ground, after a flight and before a flight (for testing). During taxiing, take-off, ascent, cruising, descent and landing the aircraft liquid cooling system 4 takes over the task of cooling the heat load 12. The control device 8 may have a special mode, with the aid of which the communication between the auxiliary cooling device 100 and the control device 8 is controlled. The auxiliary cooling device 100 may also be configured to fill, drain and/or replenish coolant of the aircraft liquid cooling system 4. In the embodiments according to FIGS. 1 and 2 it has to be ensured that the connection lines of the auxiliary cooling device 100 as well as the coolant supply line 24 and the coolant discharge line 22 are vented. The first valve may take the form of a ball valve, a return valve or an electrically controlled control-valve or may be integrated in the pump 14. The auxiliary cooling device 100 may comprise a diesel motor with an integrated generator. The auxiliary cooling device 100 may also be operated electrically.

It is an advantage of the invention that the aircraft liquid cooling system 4 has a lower weight than corresponding systems of prior art. The fuel consumption of the aircraft 2 is therefore reduced, resulting in falling operating costs. Moreover, the noise generation of the refrigerating device 6 of the aircraft liquid cooling system 4 is reduced. The refrigerating device 6 may additionally be of a more compact design, with the result that additional space is provided for other components of the aircraft 2. The auxiliary cooling device 100 according to the invention and the aircraft liquid cooling system 4 according to the invention moreover increase the reliability of cooling of the heat load 12 on the ground, for example in the event of very high ambient temperatures.

The invention claimed is:

1. An auxiliary cooling device, which is configured to be operated outside of an aircraft and connected to a liquid cooling system of the aircraft, the liquid cooling system including a refrigerating device, a coolant supply connection, a coolant discharge connection, and a control device, the auxiliary cooling device comprising:
    a cold source configured to cool a coolant down to a desired temperature, the coolant being in liquid phase,
    an auxiliary cooling device outlet connected to the cold source, the auxiliary cooling device outlet being connectable to the coolant supply connection of the aircraft liquid cooling system in order to deliver the coolant cooled to the desired temperature by the cold source to the liquid cooling system,
    an auxiliary cooling device inlet, which is connected to the cold source and connectable to the coolant discharge connection of the aircraft liquid cooling system in order to receive coolant heated by heat absorption from a heat load in the aircraft, and
    an auxiliary cooling device interface configured to receive from the control device of the liquid cooling system a signal that indicates at least one of a coolant requirement and a setpoint temperature of the coolant to be delivered to the liquid cooling system, the auxiliary cooling device being further configured to provide coolant in response to the receipt of said signal that indicates at least one of the coolant requirement and a setpoint temperature of coolant to be delivered.

2. The auxiliary cooling device according to claim 1, wherein the auxiliary cooling device delivers coolant cooled to the desired low temperature by the cold source at the auxiliary cooling device outlet to the liquid cooling system in accordance with the signal received by the auxiliary cooling device interface.

3. The auxiliary cooling device according to claim 1, further comprising at least one of:
    wheels configured to allow the auxiliary cooling device to be moved to the aircraft for use with the liquid cooling system, and
    connection lines extending from an airport area accommodating the auxiliary cooling device when formed as a stationary device to the aircraft liquid cooling system.

4. The auxiliary cooling device according to claim 1, further comprising:
    a filter device for filtering the coolant.

5. The auxiliary cooling device according to claim 1, further comprising:
    a diesel motor with an integrated generator, wherein the auxiliary cooling device is adapted to fill the liquid cooling system with coolant and to drain coolant from the aircraft liquid cooling system.

6. An aircraft cooling assembly, comprising:
    an auxiliary cooling device including a cold source configured to cool a coolant down to a desired temperature, the coolant being in liquid phase, an auxiliary cooling device outlet connected to the cold source, an auxiliary cooling device inlet connected to the cold source, and an auxiliary cooling device interface configured to receive a signal that indicates at least one of a coolant requirement and a setpoint temperature of the coolant to be delivered,
    the auxiliary cooling device being further configured to provide coolant in response to the receipt of said signal that indicates at least one of a coolant requirement and a setpoint temperature of coolant to be delivered, and
    an aircraft liquid cooling system, comprising:
        a refrigerating device configured to cool a liquid coolant circulating in a cooling circuit down to the desired low temperature,
        a coolant supply connection connectable to the auxiliary cooling device outlet of the auxiliary cooling device in order to receive coolant cooled down to the desired low temperature by the cold source of the auxiliary cooling device, and
        a coolant discharge connection connectable to the auxiliary cooling device inlet of the auxiliary cooling device in order to deliver coolant heated by heat absorption from a heat load in the aircraft to the auxiliary cooling device.

7. The aircraft cooling assembly according to claim 6, wherein the aircraft liquid cooling system further comprises:
    a heat exchanger, which comprises a first fluid line as well as a second fluid line thermally coupled to the first fluid line, wherein the first fluid line is connected in a fluid-conveying manner to the cooling circuit of the aircraft liquid cooling system and the second fluid line is connected to the coolant supply connection as well as to the coolant discharge connection of the aircraft liquid cooling system.

8. The aircraft cooling assembly according to claim 6, wherein the aircraft liquid cooling system further comprises:
    a control device configured to transmit via an aircraft cooling system interface to the auxiliary cooling device interface of the auxiliary cooling device the signal that indicates the coolant requirement and/or the setpoint temperature of the coolant to be delivered to the aircraft liquid cooling system.

9. The aircraft cooling assembly according to claim 8, wherein the aircraft liquid cooling system further comprises:
   a coolant supply line connected to the coolant supply connection and in which a coolant supply connection valve is arranged, and
   a coolant discharge line connected to the coolant discharge connection and in which a coolant discharge connection valve is arranged.

10. The aircraft cooling assembly according to claim 9, wherein the coolant supply line and the coolant discharge line open out into the cooling circuit of the aircraft liquid cooling system connected to the refrigerating device, and wherein a first valve is arranged in the cooling circuit between the coolant supply line and the coolant discharge line.

11. The aircraft cooling assembly according to claim 10, wherein the first valve is at least one of: formed as a ball valve, formed as a return valve, formed as an electrical control valve, and is integrated in a conveying device arranged in the cooling circuit.

12. The aircraft cooling assembly according to claim 10, wherein the control device of the aircraft liquid cooling system is adapted to control at least one of: the refrigerating device, the first valve, the coolant supply connection valve, and the coolant discharge connection valve, and wherein the control device of the aircraft liquid cooling system is adapted in a special mode to control the communication between the aircraft liquid cooling system and the auxiliary cooling system.

* * * * *